US005668910A

United States Patent [19]
Arnett

[11] Patent Number: 5,668,910
[45] Date of Patent: Sep. 16, 1997

[54] WIRE GUIDE AND OPTICAL FIBER STORAGE SPOOL ASSEMBLY

[75] Inventor: Jaime Ray Arnett, Fishers, Ind.

[73] Assignee: Lucent Technologies Inc., Murray Hill, N.J.

[21] Appl. No.: 657,461

[22] Filed: May 29, 1996

Related U.S. Application Data

[62] Division of Ser. No. 395,735, Feb. 28, 1995, Pat. No. 5,559,922.

[51] Int. Cl.⁶ .................................................. G02B 6/43
[52] U.S. Cl. ...................... 385/134; 385/135; 385/136; 361/826
[58] Field of Search ..................... 385/134–136; 361/641, 644, 826, 827, 828, 482; 174/72 A, 135

[56] References Cited

U.S. PATENT DOCUMENTS

| | | | |
|---|---|---|---|
| 4,210,380 | 7/1980 | Brzostek | 339/107 |
| 4,278,315 | 7/1981 | Osborne | 361/482 |
| 5,100,221 | 3/1992 | Carney et al. | 385/135 |
| 5,255,161 | 10/1993 | Knoll et al. | 361/826 |
| 5,430,823 | 7/1995 | Dupont et al. | 385/135 |

*Primary Examiner*—Phan T. H. Palmer

[57] ABSTRACT

A wire guide and optical fiber storage spool assembly for use with a patch panel has at least one substantially C-shaped wire guide which has first and second angled members, at least one of which can be flexed toward the other for mounting the guide to the panel. A flexible locking member extends between the angled members and can be flexed in a direction transverse to the flex direction of the angled member to permit flexing thereof. The unflexed locking member prevents flexing of the angled member when mounted to the panel and thereby prevents accidental disengagement of the wire guide from the panel.

10 Claims, 9 Drawing Sheets

WIRE GUIDE AND OPTICAL FIBER STORAGE SPOOL ASSEMBLY

This application is a division of U.S. patent application Ser. No. 08/395,735 of Jaime Ray Arnett, filed on Feb. 28, 1995 now is U.S. Pat. No. 5,559,922.

BACKGROUND OF THE INVENTION

1. Field of the Invention

This invention relates to a wire guide and optical fiber storage spool for use with multimedia patch panels.

2. Description of the Related Art

In many applications, connections are required for more than one type of transmission medium to establish signal transmission paths. For example, many modern or upgraded buildings have communications connection closets with patch panels housing different types of connectors to establish connections between external networks and devices located in the building using not only conductive wires as the transmission medium, but also optical fibers. Because this type of patch panel generally serves a large number of multimedia connections, the slack of the wires and optical fibers connected by the connectors in the patch panel must be carefully managed. This management is necessary to aid a service person in locating connections of interest as well as to protect the wires and particularly the relatively fragile optical fibers, from damage that would likely occur if the slack wires or optical fibers are left dangling without any organization or protection.

In patch panels designed solely for connectors for conductive wires, wire guides attached to the patch panel have been used to organize and confine the conductive wires for the organization and protection of the slack thereof. Also, in patch panels adapted only for connectors for optical fibers, storage spools attached to the patch panel have been used to store the slack of the optical fibers for the protection and organization thereof. However, if a wire guide and storage spool as described above are attached to a patch panel for multimedia connections, the storage spool obstructs the path along which the wires are fed via the wire guides. Therefore, a wire guide and optical fiber storage spool which can be used effectively together for multimedia connections in a patch panel, would be highly desirable.

Another problem that occurs with wire guides and optical fiber storage spools for use with a patch panel is the tendency of the wire guides and/or spool to become disengaged from the patch panel, particularly if the wires or optical fibers are pulled or if the wire guide or spool is inadvertently struck by a service person. If a wire guide or spool becomes disengaged from the patch panel, the wires or optical fibers can be damaged or exposed to damage resulting in deterioration or interruption of signal transmission on the wires or optical fibers. Therefore, a wire guide and optical fiber storage spool that will not become accidentally disengaged from a patch panel, would be very beneficial.

SUMMARY OF THE INVENTION

This invention overcomes the problems described above. In accordance with this invention, a wire guide has a substantially C-shaped part with a gap through which can be laterally passed conductive wires attached to connectors of a patch panel. The conductive wires passed through the gap are confined by the interior surfaces of the C-shaped part for protection and organization thereof. From a first side of the wire guide, two angled members with substantially L-shaped surfaces extend outwardly. One of the angled members is flexible in a direction toward the other angled member and includes a cylindrical member disposed in near proximity to an end of the flexible angled member. Between the two angled members, the first side of the wire guide supports a flexible locking member. Normally, the locking member has an end disposed in near proximity to the flexible angled member so that the flexible angled member cannot be flexed toward the other angled member. However, when engaging the angled members with respective apertures defined in the patch panel, the locking member can be bent in a direction transverse to the direction in which the flexible angled member bends so that the end of the locking member clears the path of the flexible angled member. The flexible angled member then can be bent toward the other member so that the angled members can be inserted into respective apertures in the patch panel. When released, the flexible angled member returns toward its unflexed position to engage the angled members with the side of the patch panel opposite to a patch panel side facing the C-shaped part of the wire guide. After the flexible angled member is released, the locking member is no longer impeded from returning to its normal unflexed position by the flexible angled member. Accordingly, the locking member returns to its normal unflexed position with its end preventing the flexible angled member from bending. The locking member thus locks the wire guide to the patch panel so that it cannot inadvertently release from the patch panel. Preferably, the first side also has two spaced stabilizing members which contact the side of the patch panel facing the C-shaped part of the wire guide when the angled members engage with the patch panel. The contact between the stabilizing members and the side of the patch panel provides stability for the wire guide.

Opposite to the first side, a second side of the wire guide supports a slide, preferably in the shape of a wedge. The slide engages with a slide receptacle of an optical fiber storage spool in accordance with this invention.

The optical fiber storage spool includes a base supporting a spool about which is wound the slack of optical fibers connected by connectors housed in the patch panel. The spool has curved surfaces each preferably with a bending radius of 1½ inches or more so that signal transmission through the optical fibers is not adversely affected by overbending. With some present day fibers the radius of curvature can be less than 1½ inches and, in some cases, even less than one inch without degrading the optical transmission characteristics of the fibers on the spool. Accordingly, if such optical fibers are used, the spool can have a bending radius less than 1½ inches.

Supported by the base, substantially L-shaped members are angled or curved toward and arranged to oppose an outer surface of the spool. Disposed between the L-shaped members along the outer surface of the spool, tabs extend from the spool at a level above the base. Optical fibers are wound by hand on the spool by holding the optical fiber above the level of the tabs and ends of the L-shaped members. By bending the optical fiber away from the spool to clear a tab and then lowering the optical fiber to a level below the tab, the optical fiber is confined by the tab. Then, while holding the optical fiber in proximity to the tab at a level below the tab, the optical fiber adjacent to the tab is bent toward the spool to clear an end of an L-shaped member and then lowered to and held at a level below the end of the L-shaped member. By repeating the above operations, the optical fiber is wound on the spool. Alternatively, the optical fiber can be threaded between the L-shaped members and the outer surface of the spool at a level below the tabs and ends of the L-shaped members. In either case, the L-shaped members and the tabs confine the optical fibers in proximity to the spool.

The base supports guides disposed along a side of the spool. The guides are approximately V-shaped with respective apexes arranged nearer to the spool relative to the two ends of respective side surfaces of the guides. The side surfaces of each guide are arcuate and serve to guide the optical fibers to respective connectors in the patch panel. The arcuate surfaces of the guides should have a bending radius sufficiently large that optical transmission will not be significantly degraded in the fiber by overbending. Preferably, the outer guides are formed integrally with respective slide receptacles supported by the base. The slide receptacles are adapted to receive slides of respective wire guides at open bottom ends thereof. The slide receptacles each have two opposing channels, substantially U-shaped in cross-section, between which a slide is guided. Between the channels of each slide receptacle, a flexible ledged member is formed integrally with the slide receptacle. When the narrower top end of the wedge-like slide is inserted in a respective open end of and slid into each slide receptacle, the ledge of a respective flexible ledged member causes it to bend in a direction away from the slide. When a leading end of the slide slips along the U-shaped channels to abut the top end of the slide receptacle, the ledged member bends back toward its normal, unflexed position so that the ledge slips into engagement with a respective bottom end of the slide, thus holding the slide in a respective slide receptacle. The optical fiber storage spool is thus supported by the wire guides.

Adjacent to the slide receptacles, the base supports two optical fiber cable holders used to hold optical fiber cables fed to external networks. Each optical fiber cable holder defines a surface level with the base with two eyelets disposed under the surface. The cable housing optical fibers wound on the spool can be tied down to the surface with a tie threaded through the eyelets and fastened. Preferably, the tie is an elongated, flexible strip with an expandable receptacle head at one end and a relatively thick tail at its other end. By inserting the tail through the expandable receptacle head, the tie can be fastened about the optical fibers to hold them against the surface of the holder.

The wire guide and optical fiber storage spool of this invention is suitable for use with multimedia patch panels because the assembly effectively allows wires and optical fibers to be used with a common patch panel. Also, the wire guides lock into engagement with the patch panel, and the optical fiber storage spool locks into engagement with two wire guides so that the wire guides and storage spool will not inadvertently release from engagement and expose the wires and/or optical fibers to damage. Further, the guides and optical fiber cable holders of the storage spool allow for significant organization and protection of optical fibers whose slack is wound on the storage spool. In addition, the conductive wires are ordered and protected by confinement in the C-shaped parts of respective wire guides.

These together with other objects and advantages, which will become subsequently apparent, reside in the details of construction and operation as more fully hereinafter described and claimed, reference being had to the accompanying drawings, forming a part hereof, wherein like numerals refer to like parts throughout.

BRIEF DESCRIPTION OF THE DRAWINGS

The present invention can be better understood with reference to the following drawings. The drawings are not necessarily to scale, emphasis instead being placed upon clearly illustrating principles of the present invention.

DESCRIPTION OF THE PREFERRED EMBODIMENTS

Figure 1:
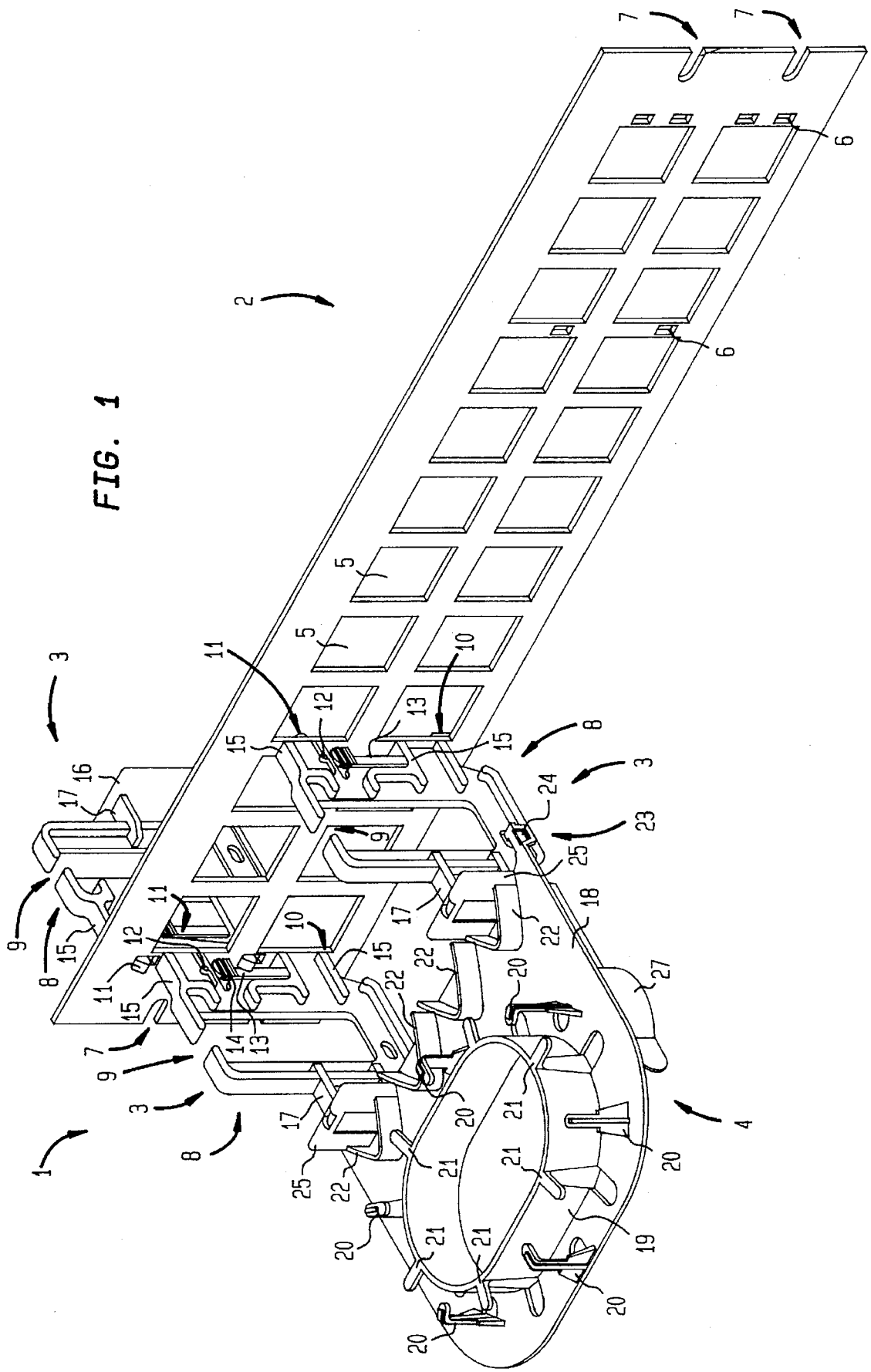
FIG. 1 is a perspective view of the wire guide and optical fiber storage spool assembly in accordance with this invention, engaged with a patch panel.

In FIG. 1, a wire guide and optical fiber storage spool assembly 1 in accordance with this invention is engaged with a patch panel 2. The assembly 1 includes a pair of wire guides 3 and an optical fiber storage spool 4 engaged with the pair of wire guides 3. The pair of wire guides 3 are situated on a first side of the patch panel 2. To a second side of the patch panel 2, a third wire guide 3 is attached. Preferably, the wire guide 3 and the storage spool 4 are formed of a plastic material such as acrylonitrile-butadiene-styrene (ABS) or polycarbonate, or a mixture of ABS and polycarbonate.

The patch panel 2 defines an array of apertures 5 (only a few of which are specifically indicated in FIG. 1) to receive and house connectors (not shown in FIG. 1) such as telephone-type jacks, BNC and F-type connectors for conductive wires, and ST, SC and duplex SC connectors for optical fibers. The apertures 5 are preferably standardized and measure 1⅛" in height and 1" in width. The patch panel 2 is preferably formed from a ⅛" thick plate of metal or other material. The patch panel 2 is suitable for use as an AT&T M1000 Multi-Max Panel®.

The patch panel 2 also defines apertures 6 (only a few of which are specifically indicated in FIG. 1) which are smaller than the apertures 5 and are used to engage the wire guides 3 to the patch panel 2. At either end, the patch panel 2 defines slots 7 for receiving screws or the like to mount the panel 2 to a rack (not shown in FIG. 1).

Each wire guide 3 has a substantially C-shaped part 8 defining a gap 9. Through the gap 9, conductive wires (not shown in FIG. 1) can be laterally slipped by a person servicing the patch panel 2 for confinement in the C-shaped part 8. Alternatively, the conductive wires can be threaded through the C-shaped part 8. From a first side, each wire guide 3 includes an angled member 10 with a substantially L-shaped surface engaging with a bottom edge of a respective aperture 6 and a side of the patch panel 2 opposite to the side facing the C-shaped part 8. At the first side of each wire guide 3, a second angled member 11 extends from the C-shaped part 8. The second angled member 11 is spaced from the first angled member 10. The second angled member 11 has a substantially L-shaped surface to engage with a top edge of a respective aperture 6 as well as the side of the patch panel 2 opposite to the patch panel side facing the C-shaped part 8. Preferably, the end of the second angled member 11 has a tapered surface tending to guide the end of the second angled member 11 past the upper edge of a respective aperture 6 to allow the L-shaped surface of the second angled member 11 to engage with the patch panel 2.

Preferably, each wire guide 3 includes a cylindrical member 12 mounted in near proximity to the L-shaped end of the second angled member 11. The cylindrical member 12 provides a finger hold for a service person so that the second angled member 11 can be bent toward the first angled member 10 by pressing against the cylindrical member 12 with a finger. To provide a finger hold for both right- and left-handed persons, the cylindrical member 12 protrudes outwardly on two sides of the wire guide 3.

The second angled member 11 is flexible in a direction toward the first angled member 10 so that the wire guide 3 can be inserted into the patch panel 2 for engagement. Disposed and supported at the first side of the C-shaped part 8, a locking member 13 has an end disposed in near proximity to the second angled member 11. The locking member 13 prevents the second angled member 11 from flexing toward the first angled member 10 and becoming disengaged from the patch panel 2. To insert or remove each wire guide 3 from the patch panel 2, the locking member 13 can be bent in a direction transverse to the direction in which the second angled member 11 flexes to clear a path along which the second angled member 11 can be flexed toward the first angled member 10. To aid in pushing the locking member 13 to bend it out of the path along which the second angled member 11 flexes, a push pad 14 is provided on the locking member 13. The push pad 14 has an area of sufficient size so that a person can push the locking member 13 with a finger, and has ridged surfaces providing increased frictional contact so that a finger will not tend to slide off of the push pad 14 when pushing thereon. The push pad 14 can be pushed either into or out of the plane of the sheet of FIG. 2, so that the person can use a finger of the right-hand or of the left-hand, according to preference.

Extending from the first end, each wire guide 3 also includes two stabilizing members 15 which abut the side of the patch panel 2 facing the C-shaped part 8 when the wire guide 3 is engaged to the patch panel 2. The stabilizers 15 provide stability for the wire guide 3 when engaged to the patch panel 2. For example, the stabilizing members 17 can be T-shaped in cross-section to provide both horizontal and vertical stability for the wire guide 3. Preferably the lower stabilizer 15 extends from the first side of the C-shaped part 8 and supports the locking member 13 as well as the first angled member 10 of each wire guide 3.

At a second side opposite to the first side, the C-shaped part 8 includes a slide 16 attached to the second side of the C-shaped part 8 by a support member 17. Preferably, the slide 16 is wedge-shaped, tapering outwardly from its top end to its bottom end. The slide 16 has a width which is greater than the width of the support member 17. The slide 16 of each wire guide 3 can engage with the storage spool 4 to support the storage spool.

The optical fiber storage spool 4 includes a base 18 supporting a spool 19. In FIG. 1, the spool 19 has two arced surfaces with straight, planar surfaces running therebetween. Of course, the spool 19 can be configured in other ways such as, for example, with a cylindrical configuration. The arced surface(s) of the spool 19 should have a bending radius sufficiently large that optical transmission of the optical fiber bent about the arced surface(s), is not significantly deteriorated due to overbending.

Opposing the outer surface of the spool 19, substantially L-shaped members 20 are supported by the base 18 and curve toward the spool 19. Extending from the outer surface of the spool 19, are tabs 21 which are at a level above a surface of the base 18. The slack of optical fibers (not shown in FIG. 1) preferably buffered with plastic outer coatings, is wound about the spool 19 by weaving the optical fibers between the L-shaped members 20 and the tabs 21. More specifically, an optical fiber from a connector housed in the patch panel 2 or from an optical fiber cable is arranged at a level above the L-shaped members 20 and the tabs 21. By moving the optical fiber outwardly from the spool 19 to clear a tab 21 and lowering the optical fiber below the level of the tab 21 toward the base 18, the optical fiber is effectively confined by the tab 21. While holding the optical fiber below the panel of the tab 21, the optical fiber is then moved inwardly toward the spool 19 at a level above the spool 19 to clear the end of an L-shaped member 20. Then, by lowering the optical fiber toward the base 18, the optical fiber becomes confined by the L-shaped member 20. By repeating the above operations, the optical fiber is effectively weaved between the tabs 21 and the L-shaped members 20 onto the spool 19. Alternatively, a connector end of the optical fiber can be threaded along the outer surface of the spool 19 between the L-shaped members 20 and the tabs 21. In either case, the outer surface of the spool 19, the substantially L-shaped members 20 and the tabs 21 guide and confine optical fibers wound about the spool 19.

Along one side of the spool 19, substantially V-shaped guides 22 are supported by the base 18. The guides 22 have respective apexes that are closer to the spool 19 than the ends of the guides 22. The guides 22 each have two arcuate surfaces along which optical fibers can be guided to and from the storage spool 19. The arcuate surfaces of the substantially V-shaped guides 22 should have respective radiuses of curvature that are sufficiently large that optical transmission will not be significantly affected by overbending of the optical fibers on the arcuate surfaces of the V-shaped guides 22.

Outwardly of the guides 22, the optical fiber storage spool 4 has two optical fiber cable holders 23. The optical fiber cable holders 23 each have a surface level with the surface of the base 18, and define two eyelets 24 (not all of which can be seen in FIG. 1) through which a tie (not shown in FIG. 1) can be threaded to tie an optical fiber cable 33 housing optical fibers 34 wound on the spool 19, on the surface of each optical fiber cable holder 23. Because the optical fiber cable holder 23 firmly holds the optical fiber cable 33 as opposed to the optical fibers 34 themselves, the optical fibers 34 are less likely to be damaged if the optical fiber cable 33 is accidently pulled, for example. Also, by holding the optical fiber cable 33, the optical fiber cable holder 23 provides significant organization for the optical fibers 34 by confining them in proximity to the storage spool 4.

Supported by the base 18, the optical fiber storage spool 4 includes at least one slide receptacle 25 adapted to receive the slide 16 of a wire guide 3, for support of the storage spool 4. Preferably, for increased stability, the storage spool 4 includes two spaced slide receptacles 25 that are adapted to engage with respective slides 16 of two wire guides 3. The slide receptacles 25 have ledged members 26 which engage with respective bottom ends of the slides 16 when slid sufficiently far into the slide receptacles 25. The ledged members 26 thus lock the storage spool 4 to the pair of wire guides 3 so that the storage spool 4 cannot inadvertently release from engagement with the wire guides 3.

Because the slide receptacles 25 extend to a degree below the surface of the base 18, the optical fiber storage spool 4 has supports 27 (one of which cannot be seen in FIG. 1) extending substantially along the length of the optical fiber storage spool 4 on opposite sides of the base 18. The supports 27 are level with the ends of the slide receptacles 25 so that the storage spool 4 does not assume a tilted attitude when placed on a flat surface.

Figure 2:
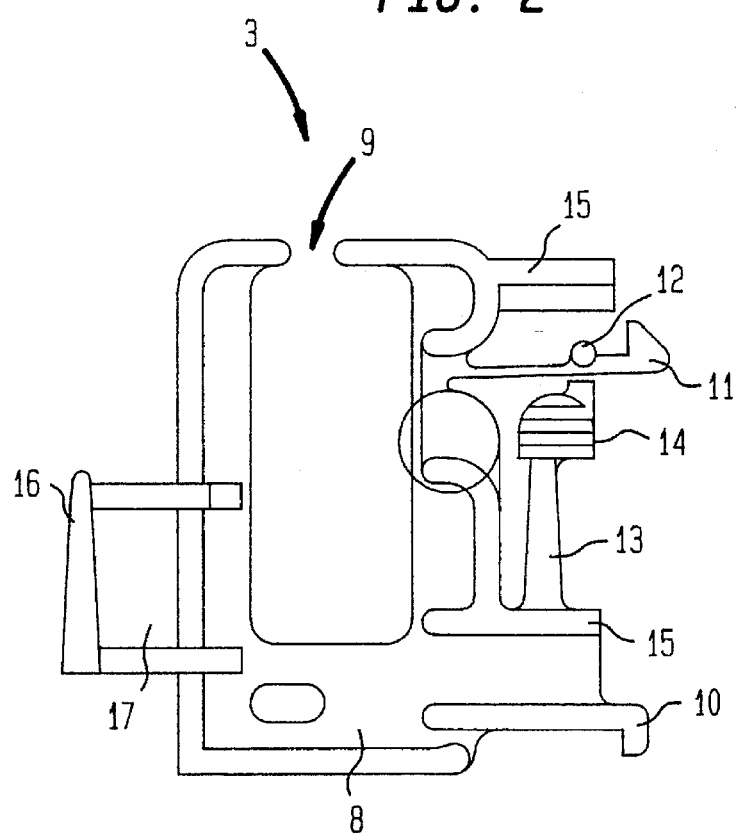
FIG. 2 is a side view of the wire guide in accordance with this invention.
Figure 3:
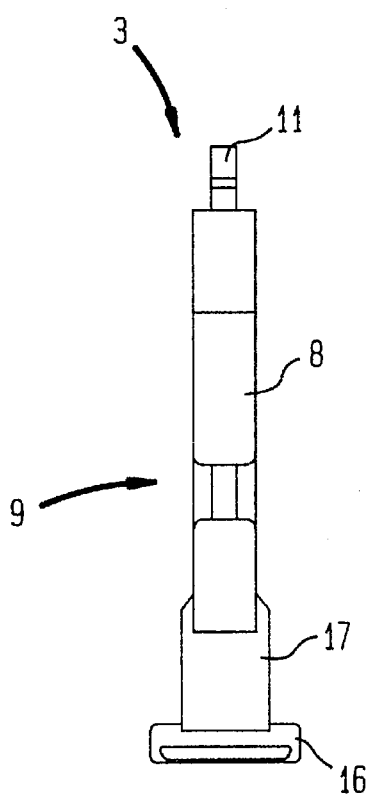
FIG. 3 is a top plan view of the wire guide.
Figure 4:
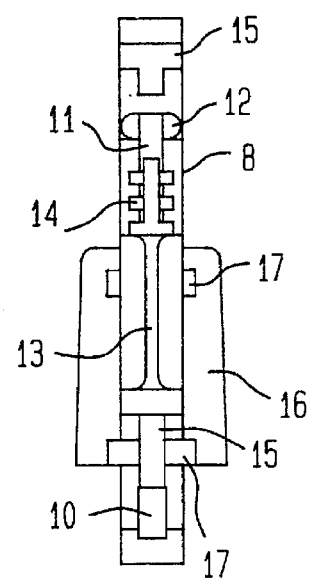
FIG. 4 is a view of the wire guide facing a first side of the wire guide.
Figure 5:
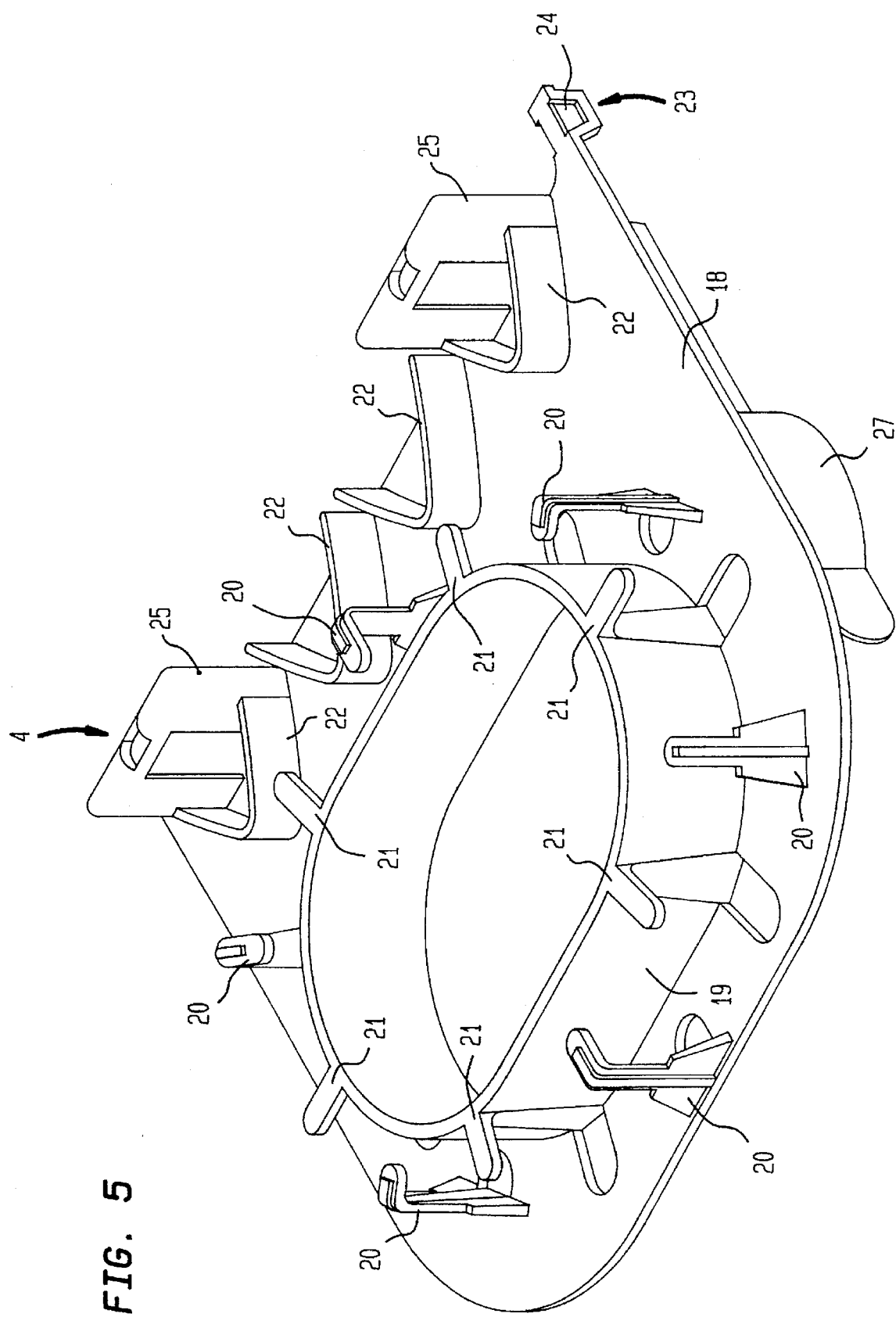
FIG. 5 is a perspective view of the optical fiber storage spool in accordance with this invention.

FIGS. 2–4 are different views of the wire guide 3 in accordance with this invention. The elements of the wire guide 3 have been previously described with reference to FIG. 1. However, FIGS. 2–4 provide a better understanding of the elements of the wire guide 3 in three dimensions.

FIGS. 5–8 are different views of the optical fiber storage spool 4 in accordance with this invention. The elements of the optical fiber storage spool 4 have been previously described with respect to FIG. 1, but FIGS. 5–8 provide a better understanding of the three-dimensional characteristics of the elements of the storage spool 4.

Figure 6:
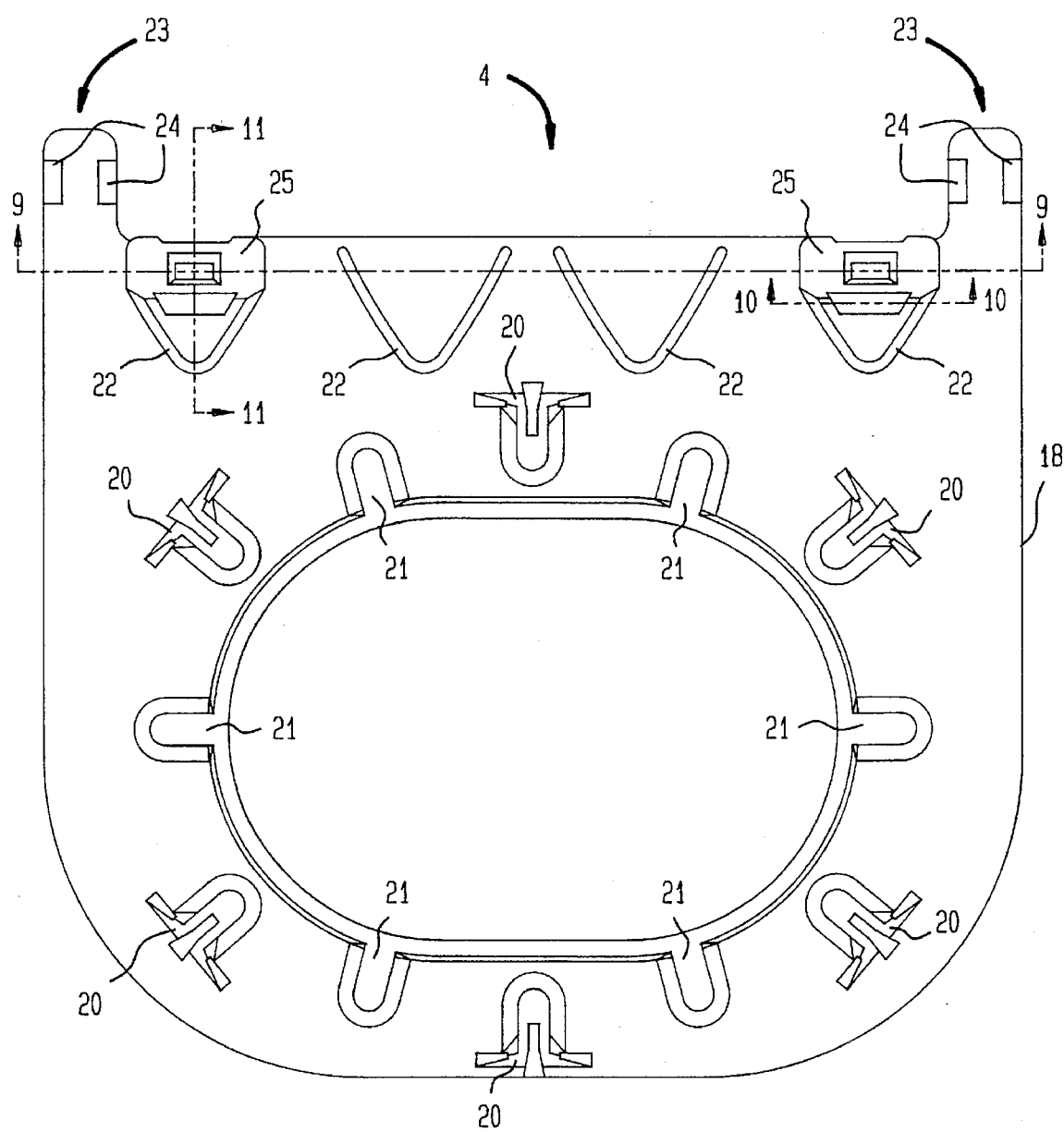
FIG. 6 is a top plan view of the storage spool.
Figure 7:
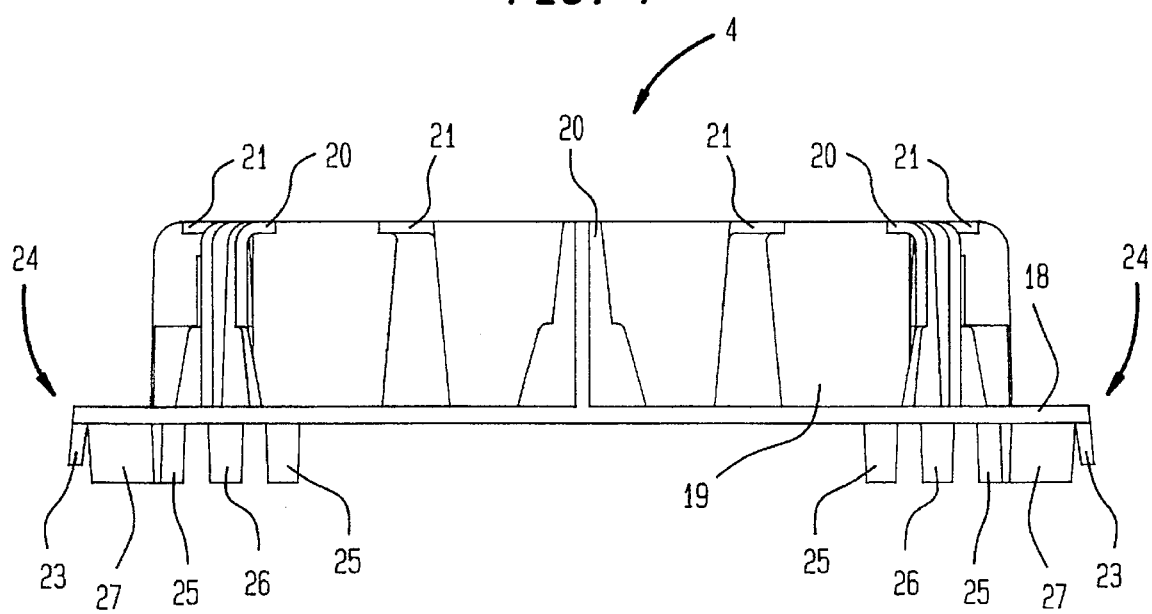
FIG. 7 is a first side view of the storage spool.
Figure 8:
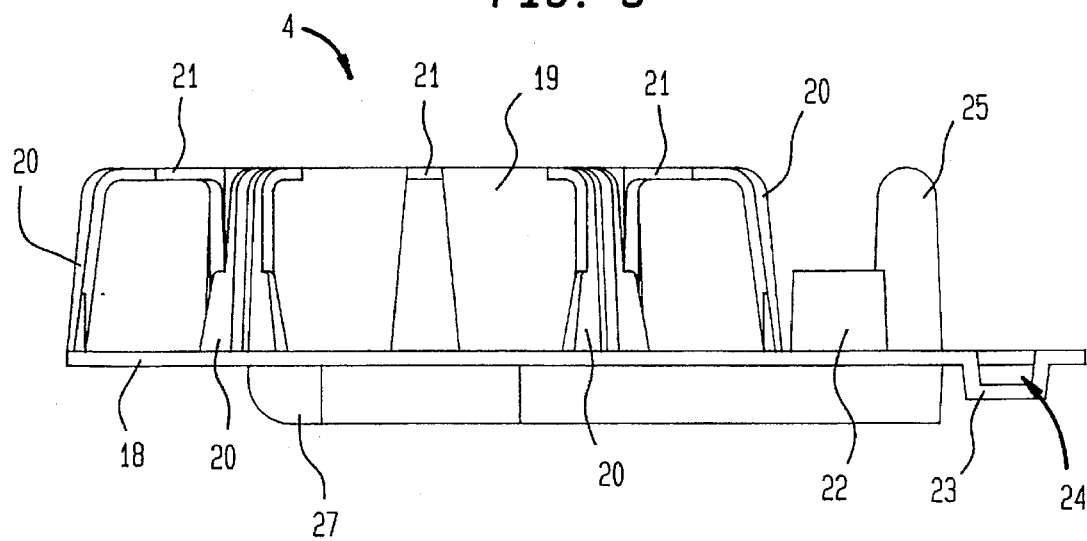
FIG. 8 is a second side view of the storage spool.
Figure 9:
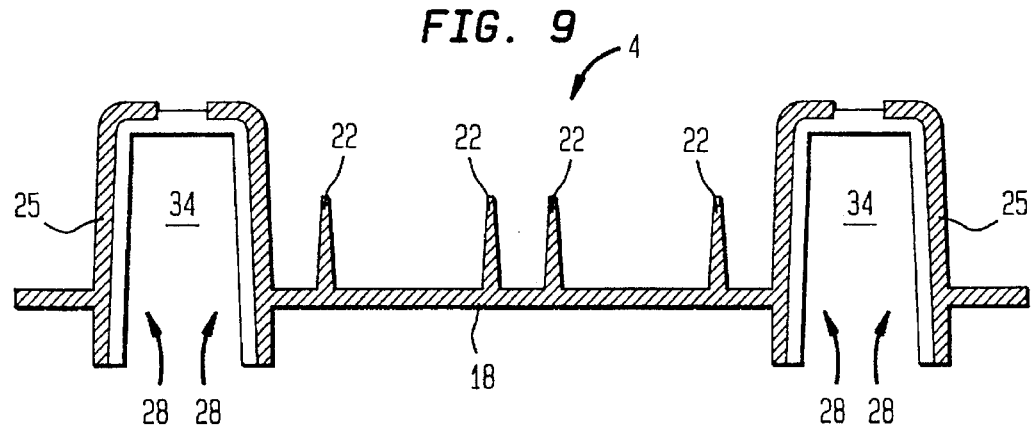
FIG. 9 is a partial cross-sectional view of the storage spool taken along the section A—A in FIG. 6.

FIG. 9 is a partial cross-sectional view of the storage spool 4 taken along the section A—A in FIG. 6. The slide receptacles 25 define substantially U-shaped channels 28 for guiding respective sides of the slide 16. In FIG. 9, the U-shaped channels 28 are cut in half. The top ends of the slide receptacles 25 are at least partially closed and define the furthest extent to which the top end of the slide 16 can be slipped into the slide receptacles 25. Also, FIG. 9 shows slots 34 defined by respective slide receptacles 25. The slots 34 allow the support members 17 to pass along respective sides of the slide receptacles 25.

Figure 10:
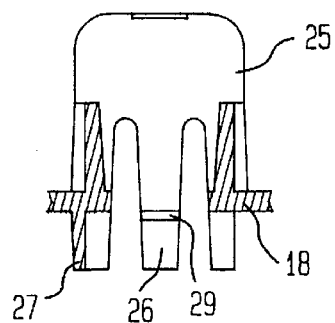
FIG. 10 is a partial cross-sectional view taken along the section B—B in FIG. 6.

FIG. 10 is a partial cross-sectional view of the slide receptacle 25 taken along the section B—B in FIG. 6. In FIG. 10, the ledged member 26 of the slide receptacle 25 can be seen. The ledged member 26 includes a ledge 29 which extends in a direction out of the plane of the sheet in FIG. 10. The ledge 29 slips under the bottom end of the slide 16 and locks the slide 16 into engagement with the slide receptacle 25.

Figure 11:
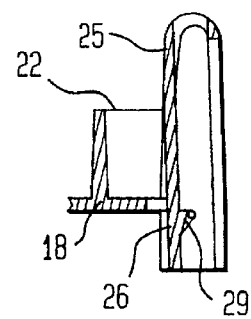
FIG. 11 is a partial cross-sectional view taken along the section C—C in FIG. 6.

FIG. 11 is a partial cross-sectional view of the slide receptacle 25 taken along the section C—C in FIG. 6. In FIG. 11, the ledge 29 of the ledged member 26 can be clearly seen.

Figure 12:
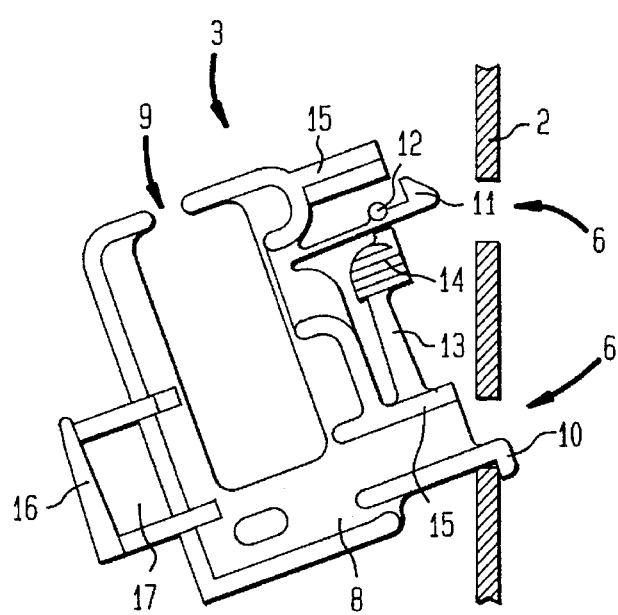
FIG. 12 is a view of a first step for engaging the wire guide to the patch panel.
Figure 13:
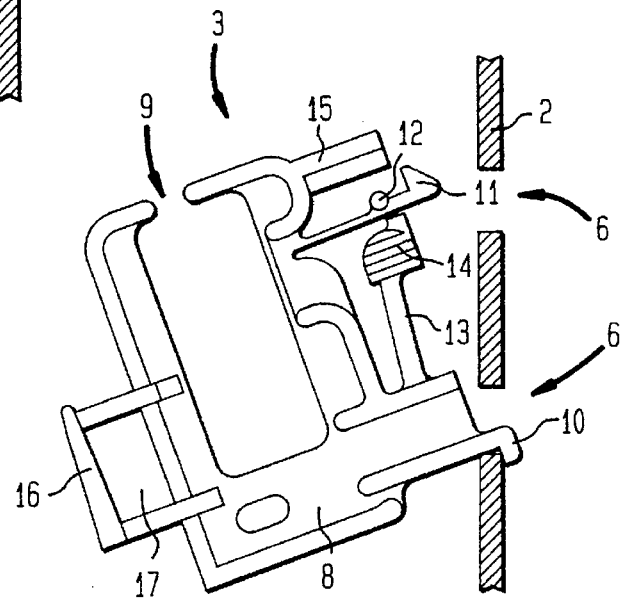
FIG. 13 is a view of a second step for engaging the wire guide to the patch panel.

FIGS. 12–15 show a sequence of operations to engage a wire guide 3 with the patch panel 2. In FIG. 12, the first angled member 12 is hooked into the bottom edge of a lower aperture 6. In FIG. 13, with the first angled member 10 engaged with the lower aperture 6, the locking member 13 is flexed in a direction transverse to the direction in which the second angled member 11 is to be flexed. For example, the locking member 13 can be flexed by pushing with a finger against the push pad 14 in a direction into (or out of) the plane of the sheet of FIG. 13. As so flexed, the locking member 13 clears a path along which the second angled member 11 can be flexed.

Figure 14:
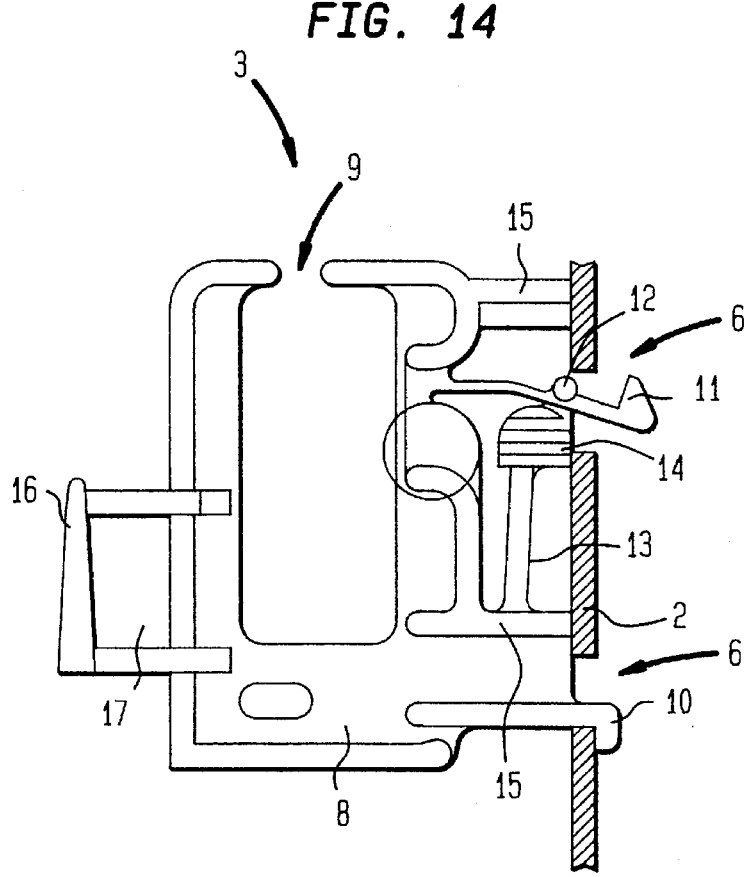
FIG. 14 is a view of a third step for engaging the wire guide to the patch panel.
Figure 15:
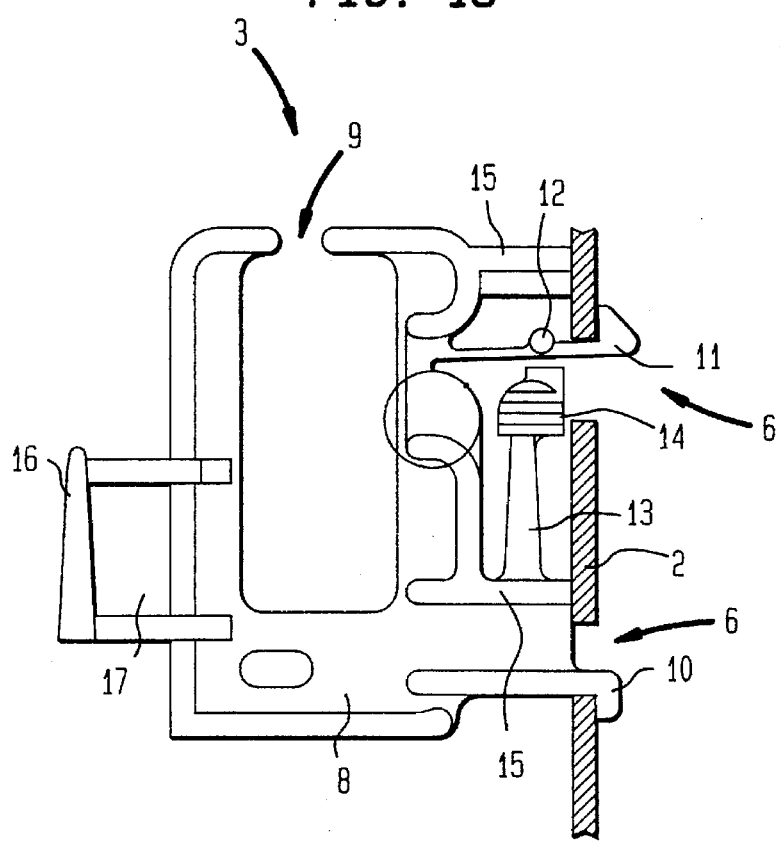
FIG. 15 is a view of the wire guide engaged to the patch panel.

In FIG. 14, with the locking member 13 still flexed, as shown in FIG. 13, the second angled member 11 is flexed toward the first angled member 10 by pressing against the cylindrical portion 12. When the second angled member 11 is flexed sufficiently far, the locking member 13 is obstructed from returning to its normal unflexed position by the second angled member 11. Accordingly, the locking member 13 can be released if desired. With the second angled member 11 flexed, the wire guide 3 is rocked about the bottom edge of the lower aperture 6 so that the end of the second angled member 11 is inserted into the upper aperture 6. The tapered edge of the second angled member 11 tends to flex the second angled member 11 toward the first angled member 10, and so helps guide the second angled member 11 into the upper aperture 6. In FIG. 15, upon releasing the second angled member 11, the L-shaped end of the second angled member 11 engages with a top edge of the upper aperture 6 and a side of the side panel 2 opposite the side facing the C-shaped part 8. Preferably, when the wire guide 3 is engaged with the patch panel 2, the second angled member 11 is flexed to a degree from its normal, unflexed position, so that a force is exerted against the top edge of the upper aperture 6 and the bottom edge of the lower aperture 6. This flexure of the second angled member 11 thus helps to maintain the wire guide 3 in engagement with the patch panel 2. When the second angled member 11 is released from its flexed position to return toward its normal, unflexed position, the locking member 13 is no longer obstructed by the second angled member 11 and thus returns to its normal, unflexed position with its end situated in near proximity to the second angled member 11. As so positioned, the end of the locking member 13 prevents the second angled member 11 from flexing toward the first angled member 10 so that the wire guide 3 is locked into engagement with the patch panel 2.

To release a wire guide 3 from engagement with the patch panel 2, the locking member 13 is bent out of the path in which the second angled member 11 flexes toward the first angled member 10, preferably by pushing against the push pad 14. The second angled member 11, no longer obstructed by the end of the locking member 13, is bent preferably using the cylindrical portion 12, toward the first angled member 10. The wire guide 3 is rocked out of engagement with the patch panel 2 using the bottom edge of the lower aperture 6 as a pivot. When the end of the second angled member 11 clears the upper aperture 6, the first angled member 10 can be pulled out of the lower aperture 6 to disengage the wire guide 3 from the patch panel 2.

Figure 16:
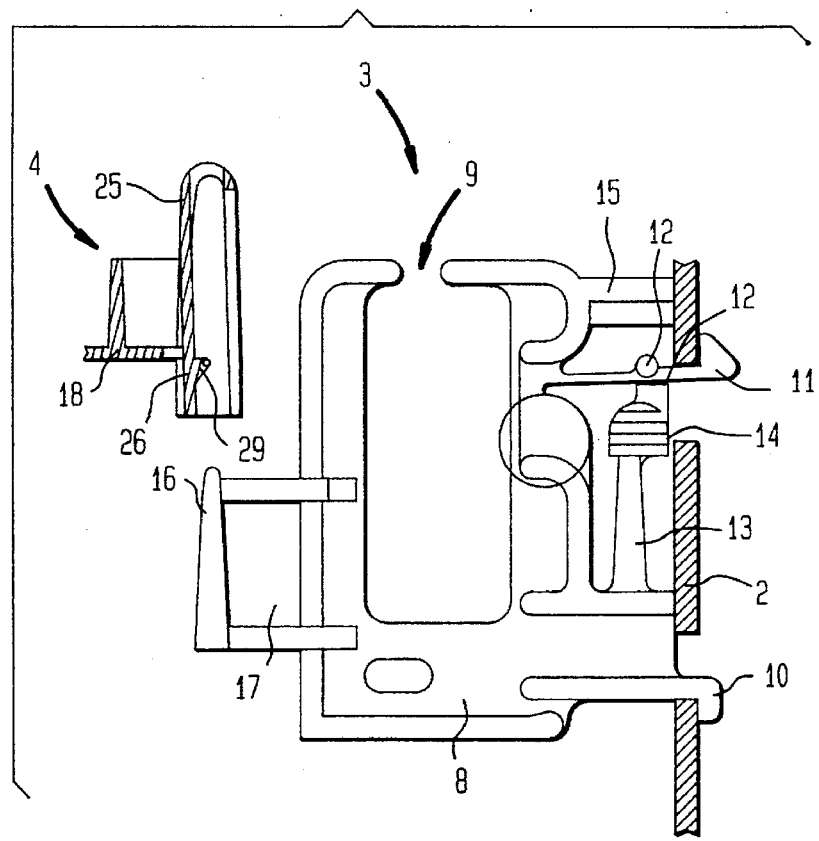
FIG. 16 is a view of a first step for engaging the storage spool with the wire guide.
Figure 17:
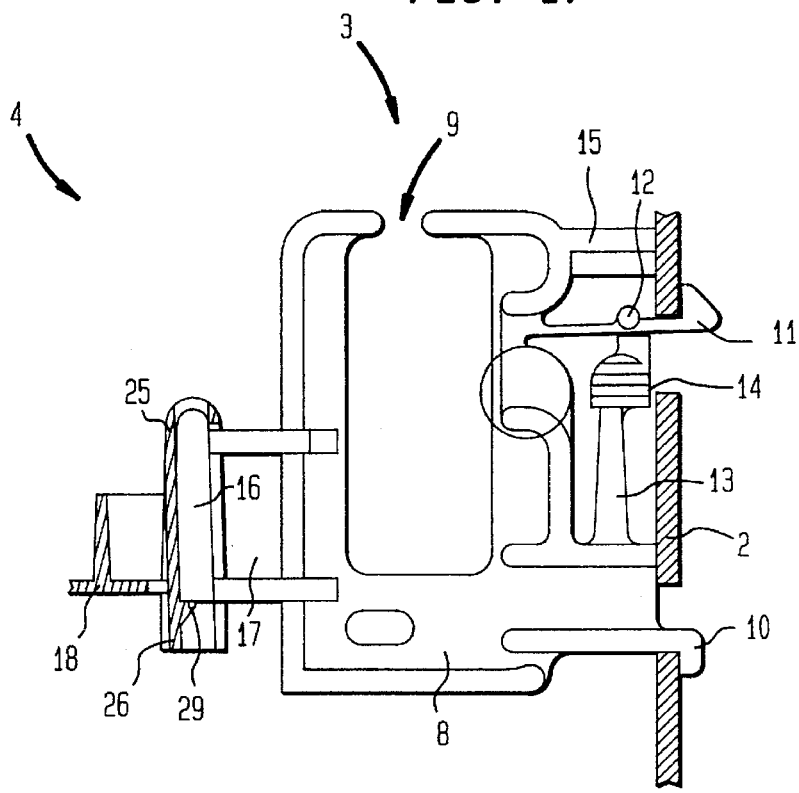
FIG. 17 is a view of the storage spool engaged to the wire guide.

FIGS. 16 and 17 show a sequence of operations to engage the storage spool 4 to a wire guide 3 engaged with and supported by the patch panel 2. Preferably, the storage spool 4 is engaged with two wire guides 3 with respective slides 16 received in respective spaced slide receptacles 25 of the storage spool 4. However, the sequence of operations for mounting a second slide receptacle 25 to its slide 16 will be understood by the sequence of operations in FIGS. 16 and 17.

In FIG. 16, the storage spool 4 is aligned so that the open end of the slide receptacle 25 is aligned with the slide 16. In FIG. 17, the storage spool 4 is moved toward the slide 16 so that the top end of the slide 16 is received in the open end of the receptacle 25. By further pushing the storage spool 4, the slide 16 slides between the U-shaped channels 28 of the slide receptacle 25 and thus is guided in the slide receptacle 25. Due to the taper of the slide 16, the surface of the slide 16 forces the ledge 29, and hence the ledged member 26, to flex away from the slide 16. When the bottom end of the slide 16 passes the ledge 29, the ledged member 26 flexes toward its normal, unflexed position so that the ledge 29 slips under the bottom end of the slide 16. The slide 16 is thereby locked in the slide receptacle 25. The storage spool 4 is then supported by the wire guide 3 which in turn is supported by the patch panel 2. For stability, it is preferred that the storage spool 4 has more than one slide receptacle 25 to engage with respective slides 16 for support of the storage spool 4 with a plurality of wire guides 3. The storage spool 4 can be disengaged from the wire guide 3 by pushing against the end of the ledged member 26 so that the ledge 29 passes beyond the edge of the bottom end of the slide 16 at which point the storage spool 4 can be pulled upwardly in FIGS. 16 and 17 relative to the wire guide 3 to slide the slide receptacle 25 out of engagement with the slide 16.

Figure 18:
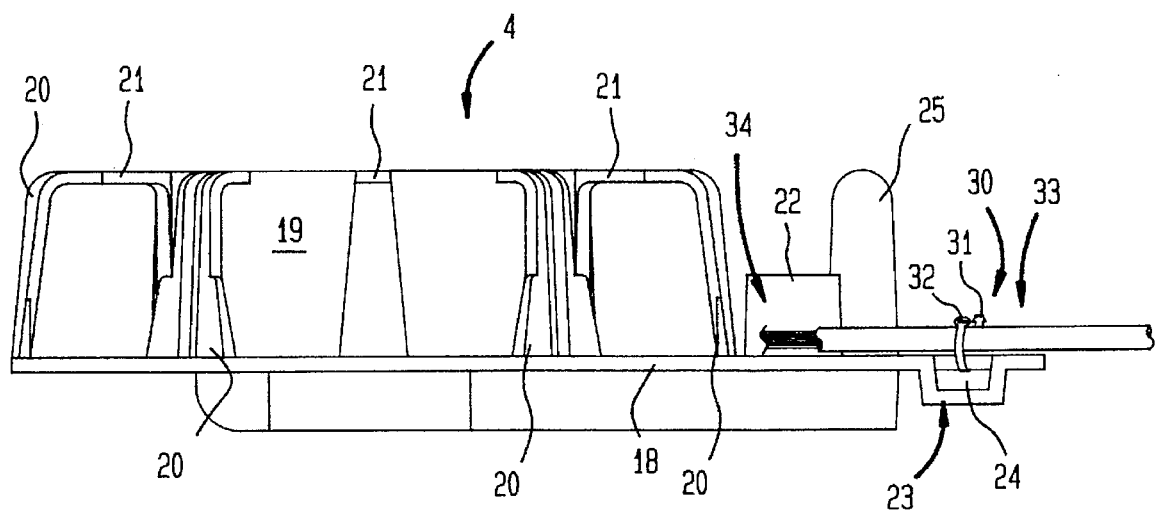
FIG. 18 is a view of a step for tying an optical fiber cable to a surface of the storage spool using an optical fiber cable holder and a tie in accordance with this invention.
Figure 19:
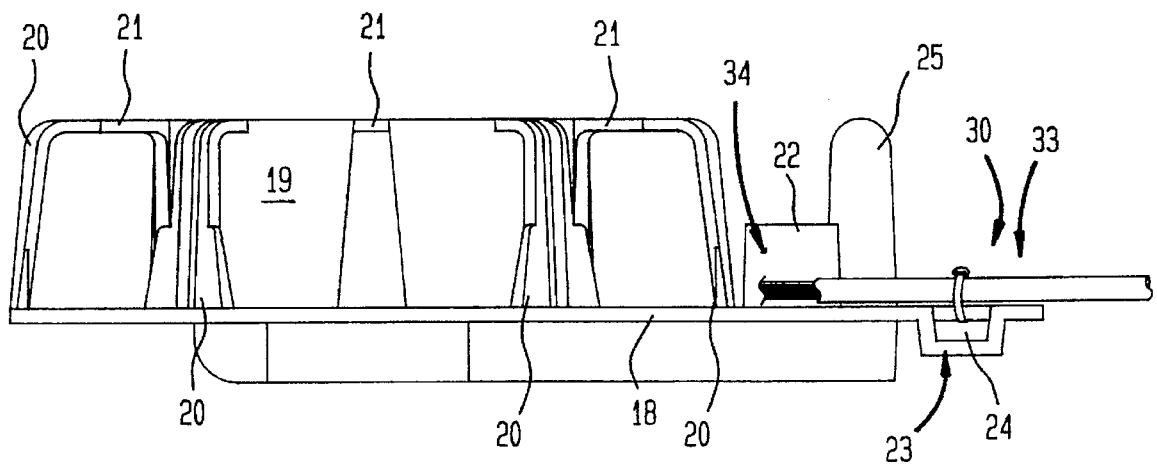
FIG. 19 is a view of the optical fiber cable tied to the storage spool with the optical fiber cable holder and tie.

FIGS. 18 and 19 show a sequence of operations for tying an optical fiber cable 33 housing optical fibers 34 with respective slack stored on the storage spool 4, to an optical fiber cable holder 23. In FIG. 18, the optical fiber cable 33 is placed on the surface of the optical fiber cable holder 23 and a tie 30 is threaded through the eyelets 24 defined by the optical fiber cable holder 23. The tie 30 is made of elongated plastic material which is flexible. The tie 30 has a relatively thick tail 31 at one end and an expandable receptacle head 32 disposed at an end of the tie 30 opposite to the head 31. The tie 30 is looped about the optical fiber cable 33 and the head 31 is inserted through the expandable receptacle tail 32 which expands sufficiently to allow the tail 31 to pass therethrough, but constricts on the relatively narrow portion of the tie 30 adjacent to the tail 31. The head 32 thus holds the tail 31 so that the tie 30 is looped about the optical fiber cable 33. Accordingly, the tie 30 is fastened about the optical fiber cable 33 to achieve organization and protection of the optical fibers 34.

Advantageously, the wire guide 3 in accordance with this invention can lock into engagement with the patch panel 2 due to the provision of the locking member 13. Also, because the second angled member 11 is flexed to a degree when engaged with the patch panel 2, the second angled member 11 in conjunction with the first angled member 10 apply a force between the bottom edge of the lower aperture 6 and a top edge of the upper aperture 6, which tends to hold the first and second members 10, 11 into engagement with the patch panel 2. In addition, the L-shaped surfaces of the first and second angled members 10, 11 each engage with an edge of respective apertures 6 and a side of the patch panel 2 to provide stability for the wire guide 3. Further, the provision of the two stabilizing members 15 on each wire guide 3 provide a relatively large surface area in engagement with the side of the patch panel 2, and accordingly affords significant stability to the wire guide 3. In addition, the slide receptacles 25 of the optical fiber storage spool 4 receive respective slide 16 of the wire guides 3 and lock into engagement therewith due to the ledged members 26. Thus, the storage spool 4 is securely held to the wire guides 3 and cannot inadvertently release, a situation which is likely to damage the optical fibers 34 whose slack is wound on the storage spool 4. In addition, the guides 22 of the storage spool 4 guide the optical fibers 34 whose slack is wound on the spool 19, to respective connectors in the patch panel 2 along arcuate surfaces thereof, a feature providing appreciable organization and protection of the optical fibers by preventing the optical fibers from overbending. Further, the optical fiber cable holders 23 and respective ties 30 allow optical fiber cables to be secured to a surface of the optical fiber cable holders 23, to provide organization and to protect the optical fibers 34 housed in the optical fiber cable 33.

Although the invention has been described with specific illustrations and embodiments, it will be clear to those of ordinary skill in the art that various modifications may be made therein without departing from the spirit and scope of the invention as outlined in the following claims.

I claim:

1. A wire guide for use with a patch panel housing connectors coupled to conductive wires, the wire guide comprising:

a C-shaped part for receiving and confining conductive wire, having a first side, a first angled member extending from the first side of the C-shaped part of the wire guide;

a second angled member extending from the first side of the C-shaped part, the second angled member capable of flexing along a path in a first direction toward the first angled member; and a locking member supported by the first side of the C-shaped part, the locking member normally disposed with an end in close proximity to the second angled member to prevent the second angled member from flexing, the locking member capable of flexing in a second direction transverse to the first direction in which the second angled member is flexed toward the first angled member, to clear the path along which the second angled member can be flexed toward the first angled member.

2. A wire guide as claimed in claim 1, further comprising:

a first stabilizing member extending from the first side of the C-shaped part, for engaging with a surface of the patch panel to stabilize the wire guide.

3. An apparatus as claimed in claim 2, further comprising:

a second stabilizing member extending from the first side of the C-shaped part, for engaging with the surface of the patch panel to stabilize the wire guide, the second stabilizing member supporting the first angled member and the locking member.

4. A wire guide as claimed in claim 1, further comprising:

a slide supported by a second side of the C-shaped part.

5. A wire guide as claimed in claim 4, wherein the first and second angled members are engaged to the patch panel, the patch panel houses connectors coupled to optical fibers, and an optical fiber storage spool having a slide receptacle is engaged to the slide of the wire guide to support the storage spool, the storage spool storing slack of the optical fibers.

6. A wire guide as claimed in claim 1, wherein the second angled member has a cylindrical member mounted in close proximity to an L-shaped surface of the second angled member, which can be pushed with a finger to move the second angled member along the first direction.

7. For use with a first structural component having first and second spaced substantially parallel angled members extending therefrom for mounting the first component in one or more openings in a second structural component, at least one of the angled members being flexible for flexing the angled member in a direction toward the other angled member to permit attaching the first component, a locking member comprising:

an elongated flexible member in the space between the first and second angled member and affixed at one end to the first component and having a distal end adjacent the flexible angled member for impeding flexing thereof;

said flexible member being flexible in a direction transverse to the direction of flexure of the flexible angled member.

8. A locking member as claimed in claim 7 and further having an enlarged portion forming a push pad adjacent the distal end thereof for receiving pushing pressure to bend said locking member out of the path of flexure of said one of said angled members.

9. A locking member as claimed in claim 8 wherein said enlarged portion is positioned to receive pushing pressure in a direction transverse to the direction of flexure of the flexible angled member.

10. A locking member as claimed in claim 7 wherein said distal end thereof is adapted to bear against the flexible angled member to prevent full flexure of the flexible angled member when said locking member is unflexed.

* * * * *